United States Patent
Graumann et al.

(10) Patent No.: US 10,198,645 B2
(45) Date of Patent: Feb. 5, 2019

(54) PREVENTING FACE-BASED AUTHENTICATION SPOOFING

(71) Applicant: Intel Corporation, Santa Clara, CA (US)

(72) Inventors: David L. Graumann, Hillsboro, OR (US); Rahuldeva Ghosh, Portland, OR (US); Ranjit S Narjala, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 112 days.

(21) Appl. No.: 14/865,763

(22) Filed: Sep. 25, 2015

(65) Prior Publication Data

US 2016/0140405 A1    May 19, 2016

Related U.S. Application Data (60) Provisional application No. 62/079,082, filed on Nov. 13, 2014.

(51) Int. Cl.
| | |
|---|---|
| *G06K 9/00* | (2006.01) |
| *G06T 5/00* | (2006.01) |
| *H04L 9/32* | (2006.01) |
| *G09C 5/00* | (2006.01) |

(52) U.S. Cl.
CPC ..... *G06K 9/00899* (2013.01); *G06K 9/00281* (2013.01); *G06K 9/00288* (2013.01); *G06T 5/002* (2013.01); *G09C 5/00* (2013.01); *H04L 9/3226* (2013.01); *H04L 9/3231* (2013.01); *G06T 2207/20182* (2013.01); *G06T 2207/30232* (2013.01)

(58) Field of Classification Search
CPC ........... G06K 9/00899; G06K 9/00281; G06K 9/00288; G06K 9/00906

USPC .......................................................... 382/118
See application file for complete search history.

(56) References Cited

U.S. PATENT DOCUMENTS

| | | | |
|---|---|---|---|
| 7,508,960 | B1 | 3/2009 | Bolle et al. |
| 8,437,513 | B1 | 5/2013 | Derakhshani et al. |
| 8,515,124 | B2 * | 8/2013 | Yoo .......................... G06K 9/00 382/100 |
| 8,542,879 | B1 | 9/2013 | Nechyba et al. |

(Continued)

FOREIGN PATENT DOCUMENTS

| | | |
|---|---|---|
| CN | 107077608 A | 8/2017 |
| CN | 107111745 A | 8/2017 |

(Continued)

OTHER PUBLICATIONS

U.S. Appl. No. 14/779,546, filed Sep. 23, 2015, Spoofing Detection in Image Biometrics.

(Continued)

*Primary Examiner* — Van D Huynh
(74) *Attorney, Agent, or Firm* — Schwegman Lundberg & Woessner, P.A.

(57) ABSTRACT

System and techniques for preventing face-based authentication spoofing are described herein. A visible light emitter may be controlled to project a pattern into a camera's field of view during an authentication attempt. An image may be obtained from the camera for the authentication attempt. A potential spoofing region on image may be identified by finding the pattern. An authentication attempt based on a face found in the potential spoofing region may be prevented.

24 Claims, 7 Drawing Sheets

(56) References Cited

U.S. PATENT DOCUMENTS

| | | | |
|---|---|---|---|
| 8,856,541 | B1 | 10/2014 | Chaudhury et al. |
| 9,202,105 | B1* | 12/2015 | Wang ............... G06Q 20/4014 |
| 9,672,415 | B2 | 6/2017 | Pfursich |
| 9,875,396 | B2 | 1/2018 | Negi et al. |
| 2006/0279726 | A1 | 12/2006 | Galambos |
| 2007/0226509 | A1* | 9/2007 | Senga ............... G06K 9/00221 713/176 |
| 2007/0253604 | A1* | 11/2007 | Inoue ............... G06K 9/00221 382/118 |
| 2008/0192980 | A1 | 8/2008 | Park et al. |
| 2010/0158319 | A1* | 6/2010 | Jung ............... G06K 9/00255 382/106 |
| 2010/0299530 | A1 | 11/2010 | Bell et al. |
| 2011/0188712 | A1* | 8/2011 | Yoo ............... G06K 9/00 382/118 |
| 2013/0015946 | A1* | 1/2013 | Lau ............... G07C 9/00 340/5.2 |
| 2013/0188840 | A1 | 7/2013 | Ma et al. |
| 2013/0219480 | A1 | 8/2013 | Bud |
| 2014/0037156 | A1 | 2/2014 | Cavallini |
| 2014/0169642 | A1 | 6/2014 | Law et al. |
| 2014/0307929 | A1 | 10/2014 | Nechyba et al. |
| 2015/0161434 | A1 | 6/2015 | Ross et al. |
| 2016/0335483 | A1 | 11/2016 | Pfursich et al. |
| 2017/0193285 | A1 | 7/2017 | Negi et al. |

FOREIGN PATENT DOCUMENTS

| | | |
|---|---|---|
| CN | 107210007 A | 9/2017 |
| EP | 1703440 A2 | 9/2006 |
| EP | 2546782 A1 | 1/2013 |
| EP | 2680192 A2 | 1/2014 |
| WO | WO-2013100898 A1 | 7/2013 |
| WO | WO-2014153462 A2 | 9/2014 |
| WO | WO-2016076912 A1 | 5/2016 |
| WO | WO-2016076914 A1 | 5/2016 |
| WO | WO-2016077590 A2 | 5/2016 |
| WO | WO-2016077590 A3 | 5/2016 |

OTHER PUBLICATIONS

U.S. Appl. No. 14/779,540, filed Sep. 23, 2015, Facial Liveness Detection in Image Biometrics.

"U.S. Appl. No. 14/779,540, Non Final Office Action dated Sep. 30, 2016", 17 pgs.

"U.S. Appl. No. 14/779,540, Preliminary Amendment filed Sep. 23, 2015", 8 pgs.

"U.S. Appl. No. 14/779,540, Response filed Dec. 30, 2016 to Non Final Office Action dated Sep. 30, 2016", 11 pgs.

"International Application Serial No. PCT/US2015/022924, International Search Report dated Jul. 29, 2015", 5 pgs.

"International Application Serial No. PCT/US2015/022924, Written Opinion dated Jul. 29, 2015", 7 pgs.

"International Application Serial No. PCT/US2015/022934, International Search Report dated Jul. 30, 2015", 3 pgs.

"International Application Serial No. PCT/US2015/022934, Written Opinion dated Jul. 30, 2015", 9 pgs.

"International Application Serial No. PCT/US2015/060392, International Search Report dated May 24, 2016", 3 pgs.

"International Application Serial No. PCT/US2015/060392, Written Opinion dated May 24, 2016", 6 pgs.

Chakraborty, Saptarshi, et al., "An Overview of Face Liveness Detection", in: International Journal on Information Theory (IJIT), vol. 3, No. 2, (Apr. 30, 2014), 11-25.

"U.S. Appl. No. 14/779,540, Notice of Allowance dated Feb. 2, 2017", 11 pgs.

"U.S. Appl. No. 14/779,546, Non Final Office Action dated May 9, 2017", 19 pgs.

"U.S. Appl. No. 14/779,546, Response filed Aug. 9, 2017 to Non Final Office Action dated May 9, 2017", 10 pgs.

"U.S. Appl. No. 14/779,546, Notice of Allowance dated Sep. 13, 2017", 8 pgs.

U.S. Appl. No. 15/876,846, filed Jan. 22, 2018, Spoofing Detection in Image Biometrics.

"European Application Serial No. 15858234.6, Extended European Search Report dated Jun. 6, 2018", 9 pgs.

"European Application Serial No. 15858459.9, Extended European Search Report dated Jun. 11, 2018", 10 pgs.

"European Application Serial No. 15859111.5, Extended European Search Report dated Jun. 6, 2018", 9 pgs.

Galbally, Javier, et al., "Face Anti-spoofing Based on General Image Quality Assessment", (Aug. 24, 2014), 1173-1178.

Kollreider, K, et al., "Verifying liveness by multiple experts in face biometrics", Computer Vision and Pattern Recognition Workshops, 2008. CVPR Workshops 2008. IEEE Computer Society Conference On, IEEE, Piscataway, (Jun. 23, 2008), 6 pgs.

* cited by examiner

PREVENTING FACE-BASED AUTHENTICATION SPOOFING

CLAIM OF PRIORITY

This patent application claims the benefit of priority, under 35 U.S.C. § 119, to U.S. Provisional Application Ser. No. 62/079,082, titled "SCREEN REFLECTION ANTI-SPOOFING SYSTEM AND METHOD" and filed on Nov. 13, 2014, the entirety of which is hereby incorporated by reference herein.

TECHNICAL FIELD

Embodiments described herein generally relate to biometric computer authentication and more specifically to preventing face-based authentication spoofing.

BACKGROUND

Facial recognition for authentication purposes allows a user to use her face to authenticate to a computer system. Generally, the user's face is captured and analyzed to produce and store a feature set to uniquely identify the user during a set-up process. When the user wishes to use her face in a future authentication attempt, a camera will capture a representation of the user's face and analyze it to determine whether it sufficiently matches the stored feature set. When a sufficient match between a current image capture of the user's face and the stored feature set is made, the user is authenticated to the computer system.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Some current facial recognition solutions are prone to be spoofed (e.g., faked) by a photo, for example, on a phone, tablet, etc. For example, a person may acquire a picture of a user, for example, via a tablet camera or from an employee's social media profile, display that picture on a device and hold the device in front of a camera being used to capture a facial representation to authenticate the user. Thus, the person has spoofed the user's real face to circumvent the face-based authentication process.

To prevent facial spoofing, some types of anti-spoofing techniques may be employed (alone or in combination), such as asking users to perform certain tasks (e.g., invoking dynamic user involvement that may be hard to predict to complicate spoofing) or analyzing the context (e.g., environment) of the image capture to determine whether the captured image represents a "live" user. Both techniques may distinguish between a live user and a facsimile, but merely asking for more user input (e.g., in the form of specific tasks, assuming body positions, etc.) may present some user experience challenges (e.g., how to represent the request, difficulty for user's to follow the request, excessive time in performing the requests, etc.). Analyzing the context in which the image was captured, however, may avoid the user experience challenges associated with a more interactive technique. Further, techniques may be employed to induce a user behavior without a specific instruction. For example, simply presenting an interesting object that is moving will capture a user's attention without the user having to be told to track the object. Such techniques may augment environmental observation without burdening the user.

One context analysis technique exploits the difference in reflectivity between an actual human face and a device or high quality print. Specifically, the flat hard surfaces of devices generally reflect visible light very well, whereas human faces tend to distort and diffuse visible light. Accordingly, spoofing of face-based authentication may be prevent by emitting a pattern of visible light into the capture space (e.g., the field of view of a camera being used to capture facial images for authentication) and searching for reproduction of the pattern. If the pattern is found in the same region of the image as a detected face, that face may be considered a spoof attempt and, for example, be excluded from the authentication process. Although this technique is described below to identify a spoofing attempt (e.g., the use of a facsimile instead of a real biometric component to authenticate a user), the same techniques may be used to identify a live biometric component, for example, when a face is detected in a region where the pattern is not detected. Thus, even in environments in which spoofing is not a concern—such as in a family home whether authentication may be primarily used to identify users for application or environment customization rather than access security— identifying a live face may reduce processing overhead or negative authentication attempts by avoiding authentication processing on inanimate representations of body parts (e.g., a doll held in a child's arms).

The visible light emission technique discussed herein does not require the user to perform additional actions at the point of authentication, and is thus an improvement over techniques that ask a user to perform additional tasks, such as moving a certain distance, blinking, etc. Moreover, this technique combats spoofing attempts of user interaction based liveness detection, these attempts typically using pre-taped videos of a target person performing the user interaction behavior with another screen (like a phone or tablet). Further, using visible light emission may illuminate the face to enhance facial feature identification for authentication. Thus, the techniques described herein improve face-based authentication resistance to spoofing attacks, provide a better user experience, and further enhance the underlying face-based authentication mechanism.

Figure 1:
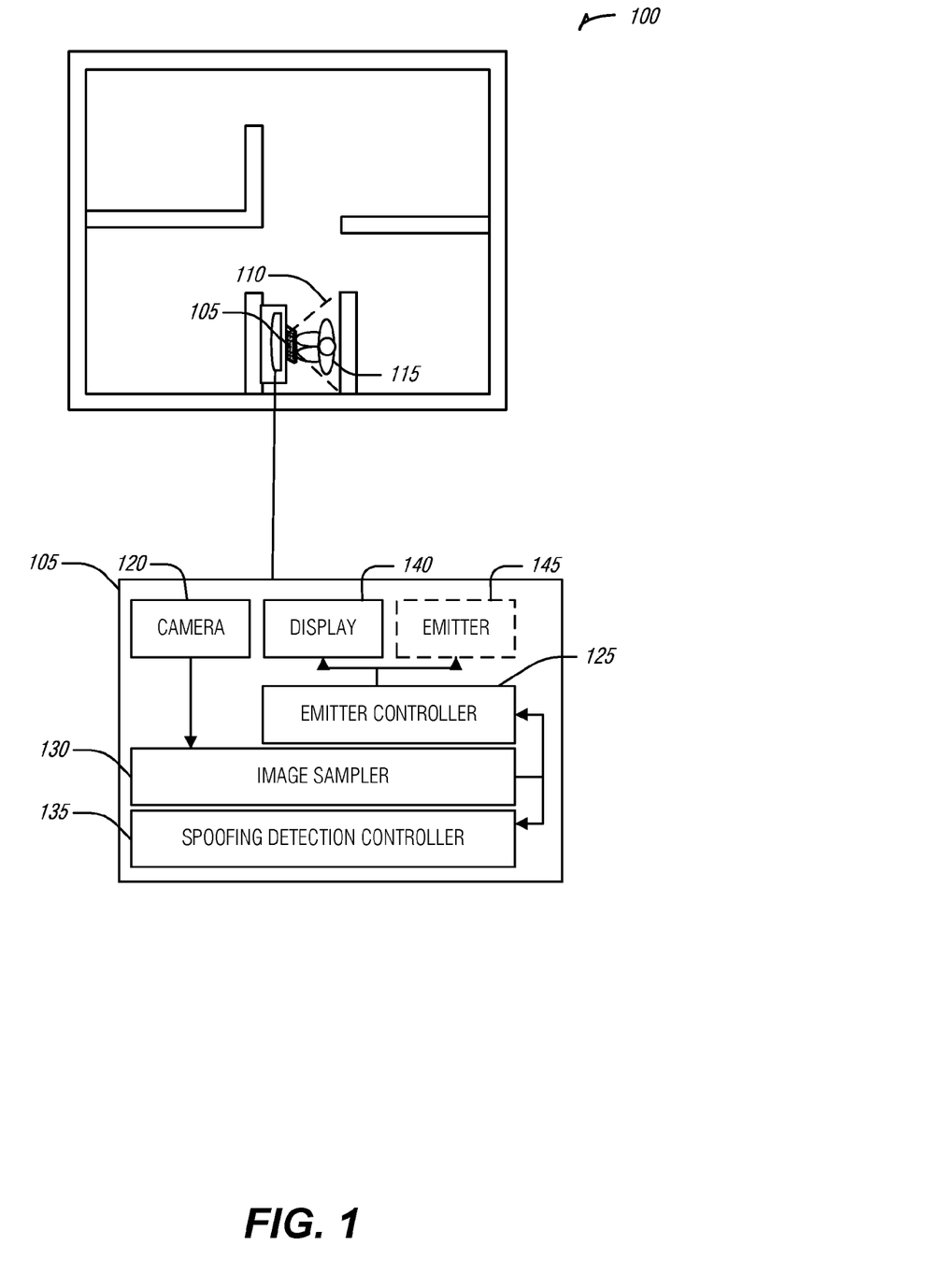
FIG. 1 is a block diagram of an example of an environment including a system for preventing face-based authentication spoofing, according to an embodiment.

FIG. 1 is a block diagram of an example of an environment 100 including a system 105 for preventing face-based authentication spoofing, according to an embodiment. The system 105 may include a camera 120 (e.g., a digital camera or video recorder, etc.), a display 140 (e.g., a screen, monitor, projector, etc.), optionally an additional visible light emitter 145 (projector, flash, strobe, etc.), an emitter controller 125, an image sampler 130, and a spoofing detection controller 135. The spoofing detection controller 135 may also be known as a liveness detection controller when the analysis is shifted from identifying a spoofing attempt to identifying a live body part (e.g., face). The system 105 may also include an authentication controller (not shown) to actually perform an authentication of a user 115. Each of these components is implemented in computer hardware, such as a circuit set, as described below with respect to FIG. 7.

The emitter controller 125 may be arranged to project a pattern into a field of view 110 for the camera 120 during an authentication attempt. For example, the user 115 may sit down at the computer and initiate a login process. The emitter controller 125 may be notified that the login process has commenced and project the pattern.

In an example, the visible light emitter is a device display. The device display may be used to present the authentication user interface (UI) with which the user 155 interacts during the authentication attempt. In an example, the patter is a background of the authentication UI. As used in this context, background refers to an element of the UI that is not integral to the use of the UI, such as an image or pattern filling space on the display device not used to convey authentication information or instructions to the user 115. Accordingly, the background is not required to be behind any other UI element.

In an example, the pattern is moving. As used herein, moving entails the changing of pattern elements (e.g., shapes, colors, etc.) over time. In an example, the changing is an animation, restricted to changes which appear to be an element translating from a first position to a second position in an emission area (e.g., projection area) of the emitter 145 or display 140. For example, a horizontal red rectangle across the width of the emission area and starting at the bottom of the emission area may, on subsequent frames, be translated upwards from the bottom of the emission are such that an immediately subsequent rendering of the rectangle overlaps the previous rendering of the rectangle. In an example, the moving pattern may be a solid color at any one given moment. For example, the pattern may be a strobe from the emitter 145.

In an example, the pattern includes a foreground and a background. As used herein, the foreground and background with respect to the pattern merely distinguish between two macro elements of the pattern. In an example, the background is a greater portion of the emission area than the foreground. In an example, the background and the foreground are respectively monochromatic. In an example, the background and the foreground are high contrast. That is, they contrast with each other to a high degree. The degree of contrast may be preset, and thus the contrast (e.g., difference in color over average color) beyond the preset demonstrates that the foreground and the background are high contrast. Example high contrast combinations include black and white, cyan and black, yellow and black, orange and black, etc. In an example, the background is white and the foreground is black. This example is useful both because the contrast between the foreground and background makes pattern identification easier, but also because the white light emission may help to illuminate the user's face for better facial feature extraction. In an example, the background may be selected specifically to enhance facial illumination for the authentication attempt. As previously noted, generally performs this task well. However, another color may be used based on, for example, ambient lighting conditions to effectuate an actual white balance (e.g., a background of blue in a red dominated ambient lighting).

In an example, the pattern may include features to distinguish it from organic features (e.g., the shapes or other characteristics of living creatures). Such features may include the omission of irregular rounded shapes because many organic features lack sharp edges or regular precision. In an example, the features include only straight lines. In an example, the straight lines are used to compose regular shapes.

In an example, the system 105 may include a library controller. The library controller may be arranged to obtain a user submitted pattern (e.g., via a configuration UI or the like). The library controller may also be arranged to test the user submitted pattern to determine whether it has features to distinguish it (the pattern) from organic features. The user submitted pattern may be tested as to whether it includes bold shapes, stark color contrasting portions, and other image details to allow an image analyzer to distinguish underlying facial features from a projected pattern on a face. In an example, the library controller may reject any submitted image that does not have such distinguishable features. In this example, rejection may include refusing entry of the submitted pattern into the library from which the emitted pattern is selected by, for example, the emitter controller 125.

In an example, the library controller may be arranged to modify a user submitted pattern to add distinguishable features. Such modifications may include the overlay of straight lines, regular shapes, or the like on the user submitted pattern. In such a way, the user may select pleasing visual elements to display during the authentication attempt without compromising the present technique. In any example, where the user submitted pattern has sufficient distinguishable features, or distinguishable features are added, the resultant submitted pattern may be added to the library for future use.

The image sampler 130 may be arranged to obtain (e.g., retrieve, receive, etc.) an image from the camera 120 for the authentication attempt. That is, the image retrieved by the image sampler is one in which an attempt to identify a face for authentication purposes will be made. In an example, the system 105 may obtain a sequence of images from the camera 20. In an example, the sequence of images may be processed to reduce noise (e.g., application of a filter). In an example, the sequence of images may be processed to reduce color information. In an example, the color information may be reduced to one bit per pixel (e.g., black and white).

The spoofing detection controller 135 may be arranged to identify a potential spoofing region of the image by finding the pattern within predetermined tolerances in the image. The predetermined tolerances permit some deviation of the reflected pattern from the original. For example, the pattern may be scaled, inverted in shape (e.g., by the reflection), color shifted, etc. The tolerances, however, are sufficient to distinguish between the generally reflective surface of a spoofing device and an actual human face. In an example of a moving pattern, to find the pattern the spoofing detection controller may be arranged to predict a position of the pattern in the image based on time. For example, the spoofing detection controller 135 may be in communication with the emitter controller 125 to control, or at least obtain, a space and time coordinate for pattern features. The spoofing detection controller 135 may use this information to determine what should be reflected at the time the image was captured by the camera 120. Here, the tolerances may define a window of time in order to account for image processing lag, emission lag, or event round-trip travel time for the emission (e.g., in the case where the camera 120 captures the image in a sequence of images at very high speed).

In an example, the spoofing detection controller 135 finds the pattern by searching for specific features of the pattern. For example, a pattern may include a white background with a black box within which is an image (e.g., selected by the user). In this example, the spoofing detection controller 135 may confine its search to the high frequency boundary of the black box and the white background, ignore the contents of the box. This may decrease the hardware required to perform the search, speed the search, or increase accuracy in the search. In an example, the searched for feature is a line edge.

In an example, the spoofing detection controller 135 may look for the pattern across a plurality of images, of which the image is one. This may benefit accuracy by providing additional information to address possible noisy images. In this example, the spoofing detection controller 135 may search for the pattern across the plurality of images, perhaps only identifying the pattern in a few of these images. The spoofing detection controller 135 may then measure a signal-to-noise ratio for a region in which the pattern was previously found, across the plurality of images. For example, if the pattern was found in two out of a hundred images in a particular region, the signal-to-noise ratio will be 2/100 ths. The ratio may then be subjected to a threshold. That is, if the region in which positive samples are found across the plurality of images includes a number of positive samples divided by the total samples is beyond the threshold, the region is a potential spoofing region.

The spoofing detection controller 135 may be arranged to prevent an authentication attempt based on a face found in the potential spoofing region. In an example, this may be accomplished by communicating the potential spoofing region to an authenticator. This example, may increase processing efficiency by allowing the facial recognition mechanism to avoid processing the potential spoofing region. In an example, the spoofing detection controller 135 may modify the image to destroy (e.g., remove any details) the potential spoofing region, thus preventing a positive authentication. In an example, the spoofing detection controller 135 may simply indicate that a spoofing attempt was made, which the authenticator acts upon to deny authentication.

Figure 2:
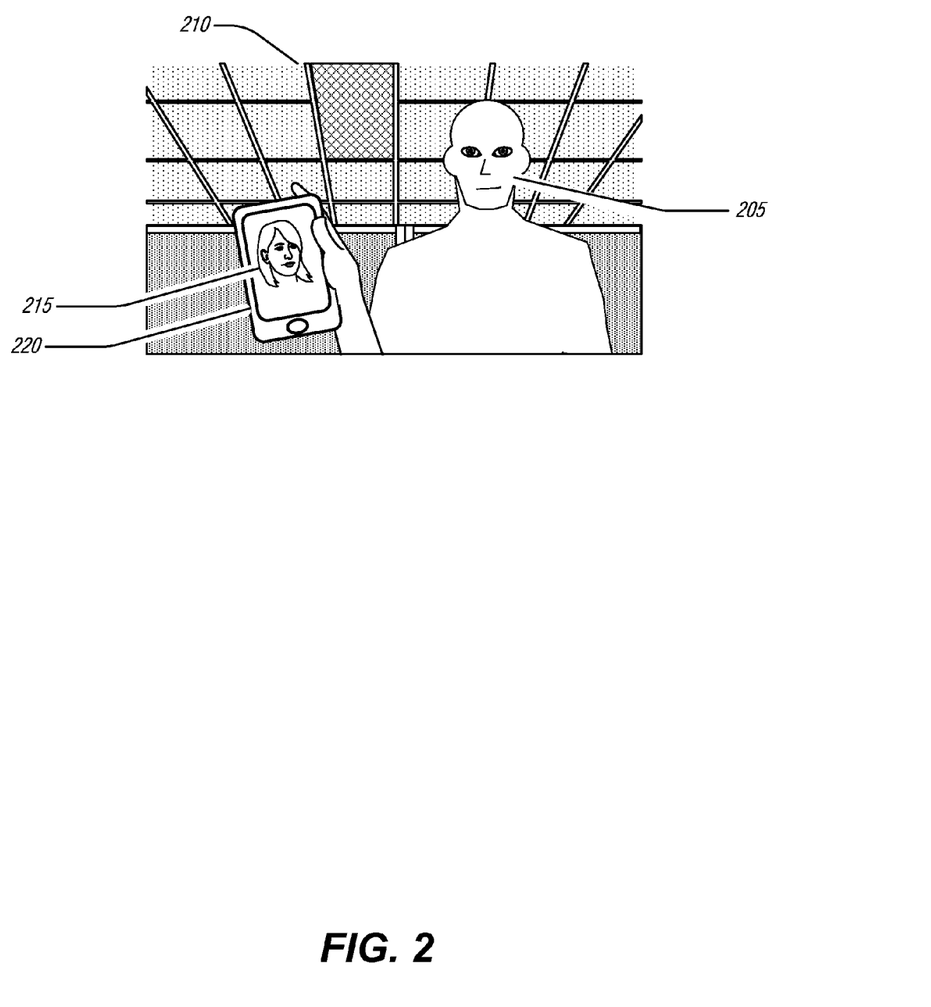
FIG. 2 is an example of a scene visible by a camera for preventing face-based authentication spoofing, according to an embodiment.

FIG. 2 is an example of a scene 210 visible by a camera 120 for preventing face-based authentication spoofing, according to an embodiment. FIG. 2 illustrates environmental components, such as a representation 205 of the user 115, a device 220, a face 215 on the device 220, and other background components. The scene 210 is the pictorial representation of the components within the field of view 110 illustrated on FIG. 1.

Figure 3:
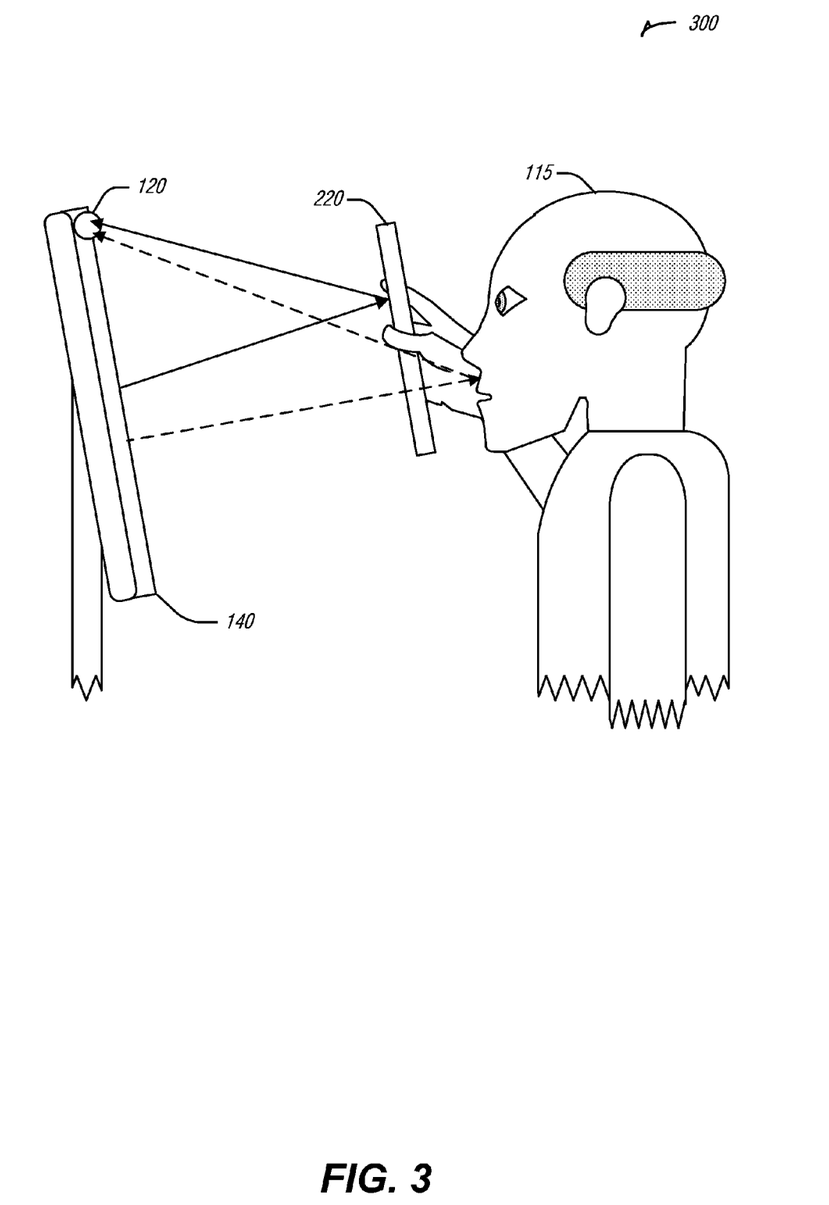
FIG. 3 is a diagram of an example arrangement of system and scene components for preventing face-based authentication spoofing, according to an embodiment.

FIG. 3 is a diagram of an example arrangement 300 of system 105 and scene 210 components for preventing face-based authentication spoofing, according to an embodiment. As noted above, emitting light into the environment may provide a fast, effective, and convenient mechanism to combat spoofing. The arrangement 300 includes the camera 120 and the display 140 for emission purposes. In an example, the emitter 145 may be used in addition to the display 140, or alone, to emit light into the environment. In the arrangement 300, the user 115 is holding the device 220. The solid arrows indicate the reflection of light from the device 145 to the camera 120 after being emitted by the display 140. Similarly, the dashed arrows indicate the reflection of light from the user 115 to the camera 120 after being emitted.

Figure 4A:
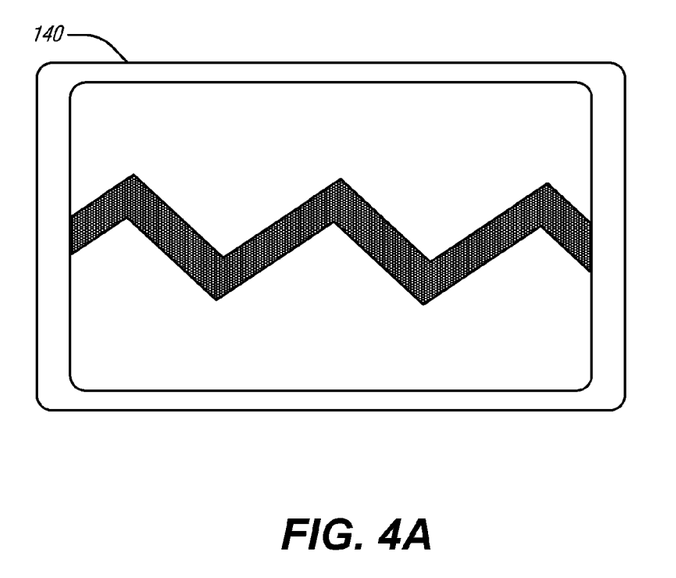
FIG. 4A is an example of an emitted pattern and FIG. 4B is an example of scene reflectivity under the emitted pattern, according to an embodiment.
Figure 4B:
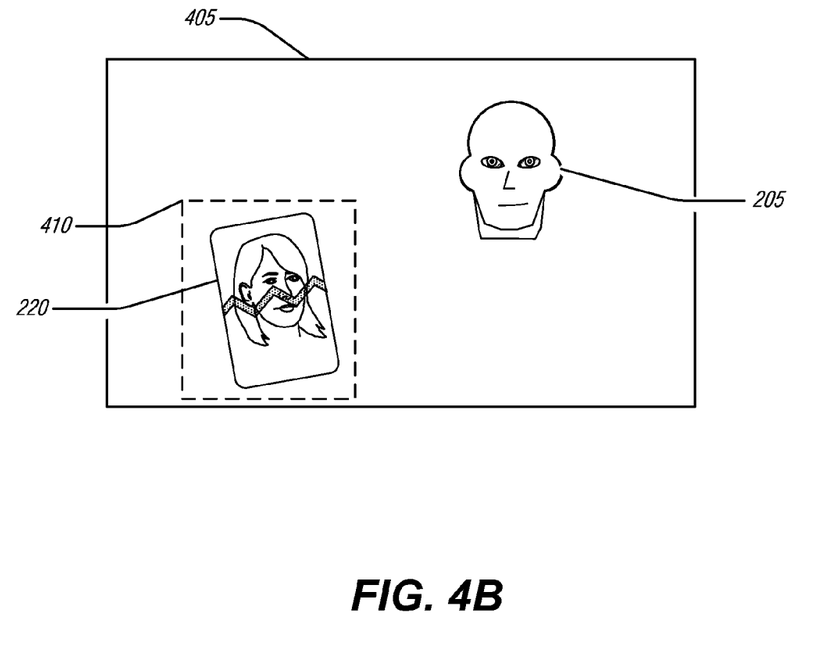

FIG. 4A is an example of an emitted pattern and FIG. 4B is an example of scene reflectivity under the emitted pattern, according to an embodiment. In this example, the illustrated "jagged" wave pattern is emitted by the display 140. Such an emission will project the pattern into the environment and reflect off of surfaces therein to be captured by the camera 120, as illustrated in FIG. 4B. Reflectivity of the visible light pattern should be greater on the shiny surface of the device 220. Thus, the pattern is observable on the device 220 but not on the representation 205 of the user 115. In an example, where the pattern is sufficiently reflected from the user 115, the non-uniform nature of the user's 115 face will result in distortions to the pattern that may be observed. Observation of these distortions may take the form of noting that the reflected pattern is outside of predetermined tolerances. In any case (e.g., non-reflectivity of the pattern off of the face 205 or distorted reflectivity), the device 220 has a differentiating reflection characteristic from that of the face 205.

The following describes additional features for this technique. This technique capitalizes on the reflective properties of many of the spoofing mediums by projecting a known pattern into the environment then detecting if a reflection is present on the spoofing image. Detection of this unique pattern in the image suggests a spoofing device 220 is being used in place of the user's 115 face. Such an approach is better than, for instance, an anti-spoofing technique based on directed, or scripted, user movement because it avoids inconveniencing the user with socially observable directed movements (e.g. scripted blink or pose movements), making it transparent during the authentication procedure. Doing so also maintains the initial ease-of-access promise of feature-based authentication.

In an example, a seemingly innocuous welcome screen is placed on the display 140. When the user 115 attempts to log in, no reflection is detected off their face 205 due to the diffusion of the pattern on the face and clothes. However, when the device 220, such as a phone or tablet presents an individual's face to the camera 120, the pattern of the welcome screen, as projected by the display 140, is reflected from the screen of device 220. In an example, the features of the pattern are tracked across multiple images in the sequence of images. If the signal to noise ratio is above a threshold, then this face 215 is declared invalid.

In an example, the pattern includes features that separate well from organic shapes found on the human face, upper torso, or other items of the body or worn on the body. In an example, pattern is selected from a library of patterns. In an example, the pattern is part of the hardware, software, or firmware of the camera 120. In an example, the pattern is supplied by the user 115. In an example, when pattern is submitted by the user 115, analysis and feature extraction may be performed on the pattern by the system 105 to ensure the pattern may be detected when reflected off of the device 220.

In an example, the pattern may move across the display 140. The dominant characteristic of a static image is the sharp edge contrast of straight lines. In an example, a moving set of high contrast line edges may sweep (e.g., scan) across the display 140 at a fixed, or known variable (e.g., conforming to a known function), rate of movement and thus be effective at detecting static images. This approach also has the benefit of increasing the signal to noise ratio. It also avoids the problem of features of the static pattern falling on parts of the face (e.g., a beard) that obscure the important aspects of the pattern. In an example, the system 105 may search for the features of the swept line or lines in the sensor's 120 field of view 110. If a pattern feature is detected in an image, the location of that feature in subsequent images is predicted using knowledge of the sweep rate and the sensor 120 sample time. In this way, additional certainty is achieved that the reflected pattern is being generated by the system 105.

Figure 5:
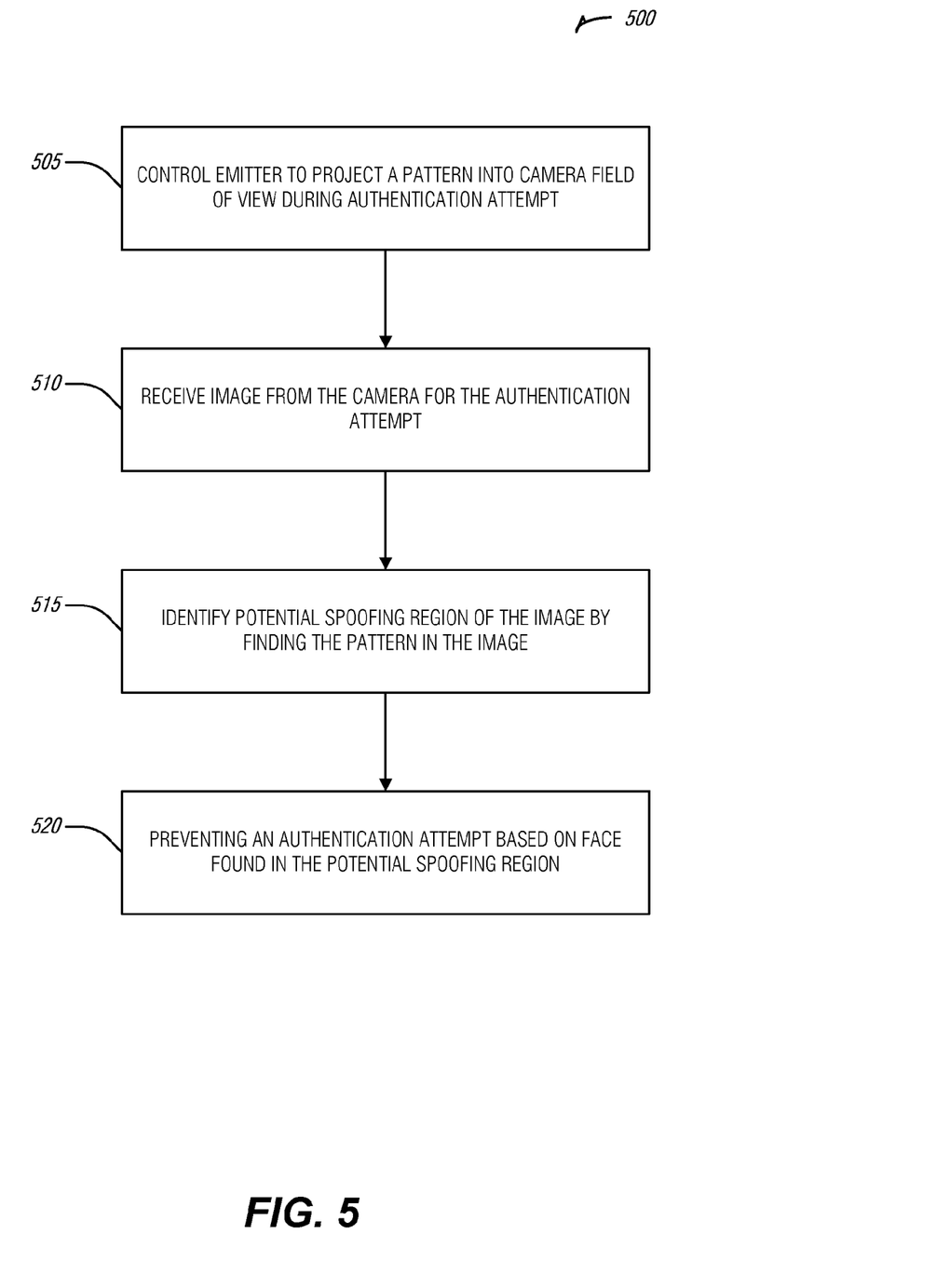
FIG. 5 illustrates a flow diagram of an example of a method for preventing face-based authentication spoofing, according to an embodiment.

FIG. 5 illustrates a flow diagram of an example of a method 500 for preventing face-based authentication spoofing, according to an embodiment.

At operation 505, a visible light emitter may be controlled to project a pattern in a field of view for a camera during an authentication attempt using a face. In an example, the emitter may be a device display. In an example, the pattern is a background of an authentication UI. In an example, the pattern may include a background and a foreground. In an example, the background and foreground are high contrast. In an example, the foreground is black and the background is white. In an example, the background is selected to illuminate the face for the authentication attempt.

In an example, the pattern includes one or more features to distinguish it from organic features. In an example, the pattern consists of one or more straight lines. In optional operations, the method 500 may receive a user submitted pattern and test the user submitted pattern to determine whether it has features to distinguish it from organic features. In an example, the method 500 may optionally include the user submitted pattern in a library of patterns when it does have features to distinguish it from organic features, and reject the user submitted pattern otherwise. In an example, the method 500 may optionally include adding features to the user submitted pattern, the added features being distinguishable from organic features, before putting the pattern into the library. In an example, the additional features are only added when the user submitted pattern does not have distinguishable features. In an example, the pattern is moving. In an example, the pattern includes an element scanning across an emission area of the visible light emitter.

At operation 510, an image from the camera may be received for the authentication attempt.

At operation 515, a potential spoofing region may be identified by finding the pattern, within predetermined tolerances, in the image. In an example, finding the pattern within predetermined tolerances in the image may include finding a feature of the pattern, as opposed to matching the entire pattern. In an example, the feature is a line edge. In an example where the pattern is moving, finding the pattern within predetermined tolerances may include predicting a position of the pattern in the image based on time.

In an example, identifying a potential spoofing region of the image by finding the pattern within predetermined tolerances in the image may include find the pattern across a plurality of images. A signal-to-noise ratio may be measured for a region in which the pattern was previously found across the plurality of images. The region may be made into the potential spoofing region when the signal-to-noise ratio is beyond a threshold.

At operation 520, an authentication attempt based on a face found in the potential spoofing region may be prevented.

Figure 6:
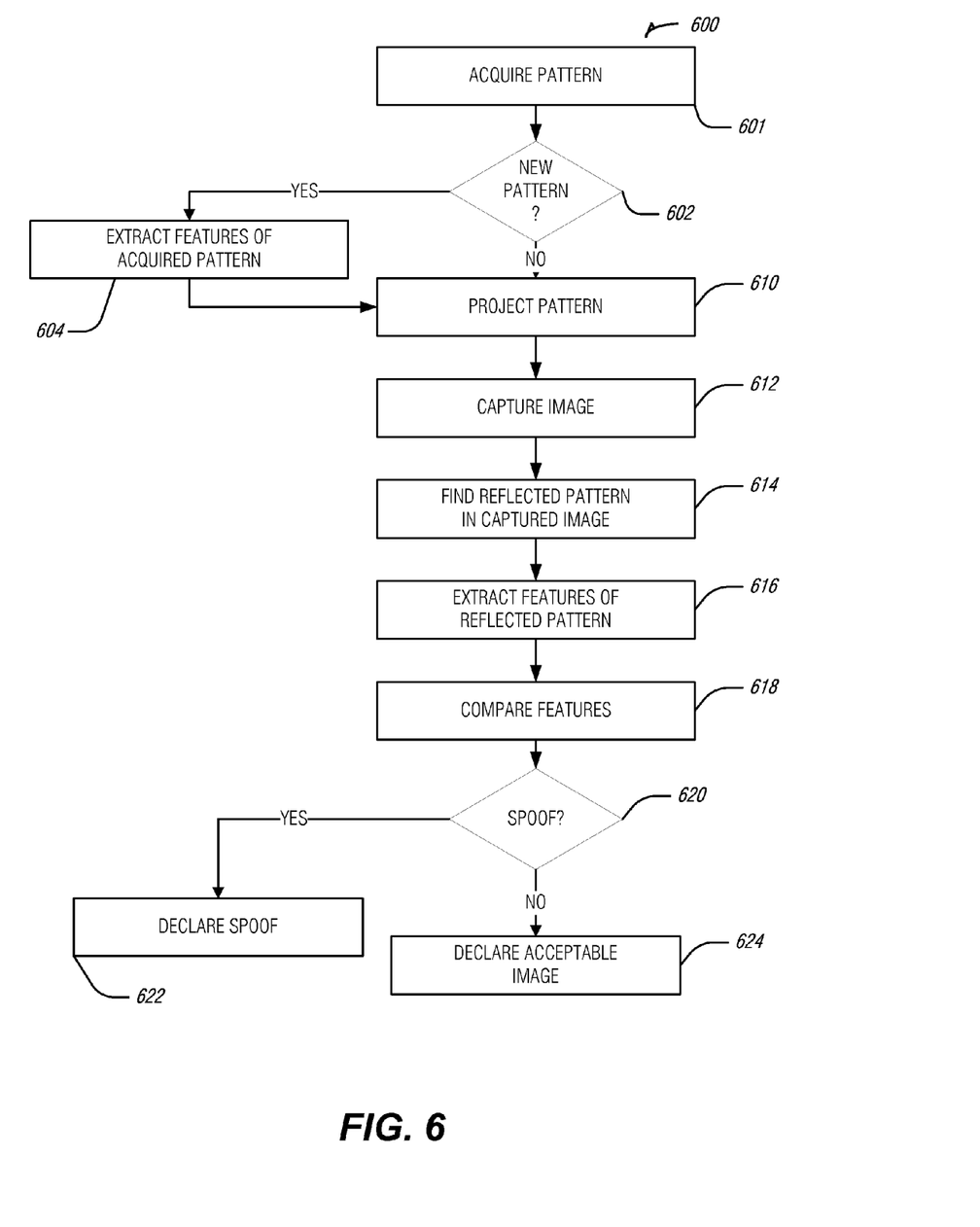
FIG. 6 illustrates a flow diagram of an example of a method for preventing face-based authentication spoofing, according to an embodiment.

FIG. 6 illustrates a flow diagram of an example of a method 600 for preventing face-based authentication spoofing, according to an embodiment. In the example embodiment of FIG. 5, a pattern is acquired at 601 and a check is made at 602 to determine if the pattern is a new pattern (or one supplied by the user). If the pattern is not a new pattern, control moves to 610 and the pattern is projected from display 108.

If, at 602, the pattern is a new pattern, control moves to 604, and the features of the new pattern are extracted. Control then moves to 610, where the pattern is projected from display 108.

At 612, an image is captured by a camera and, at 614, the captured image is analyzed to identify the reflected pattern in the captured image. In an example, the acquired image will contain only a faint noisy version of the reflection. In this example, noise analysis may be performed on the captured image and estimation of the reflected pattern may be extracted before attempting to extract pattern features at 616.

At 616, features of the reflected pattern are extracted from the captured image. At 618, the features extracted from the reflected pattern are compared to those extracted from the acquired pattern and a determination is made at 620 as to whether they match (within specified tolerances). If so, control moves to 622 and the image is declared a spoof. Otherwise control moves to 624 and the image is declared an acceptable image.

As noted above, a check is made at 618 to see if the pattern sent at 610 matches a reflection in the image. In an example, this is done by measuring the distance between the high contrast lines. This approach is particularly effective when the lines in pattern 120 are moving.

In an example, a distance comparison is used when the pattern is moving. For example, the pattern may be placed at a random position of the screen, which is recorded. Then x milliseconds later (where, for example, x is between 250 milliseconds to 1000 milliseconds) a frame is captured at 612, the reflected pattern is detected at 614 and its features extracted for pattern matching at 616. If the original pattern matches that of the reflected pattern, at 618, the position of the reflected pattern is checked against an expected position for the pattern. If the position of the reflected pattern matches that expected position, given the expected travel distance and the direction of the moving pattern, then a spoof can be ascertained with a higher confidence. In an example, if the distance traveled of the pattern matches the expected travel distance for the pattern, within a pre-defined threshold when checked at 618, a spoof is declared at 622.

Figure 7:
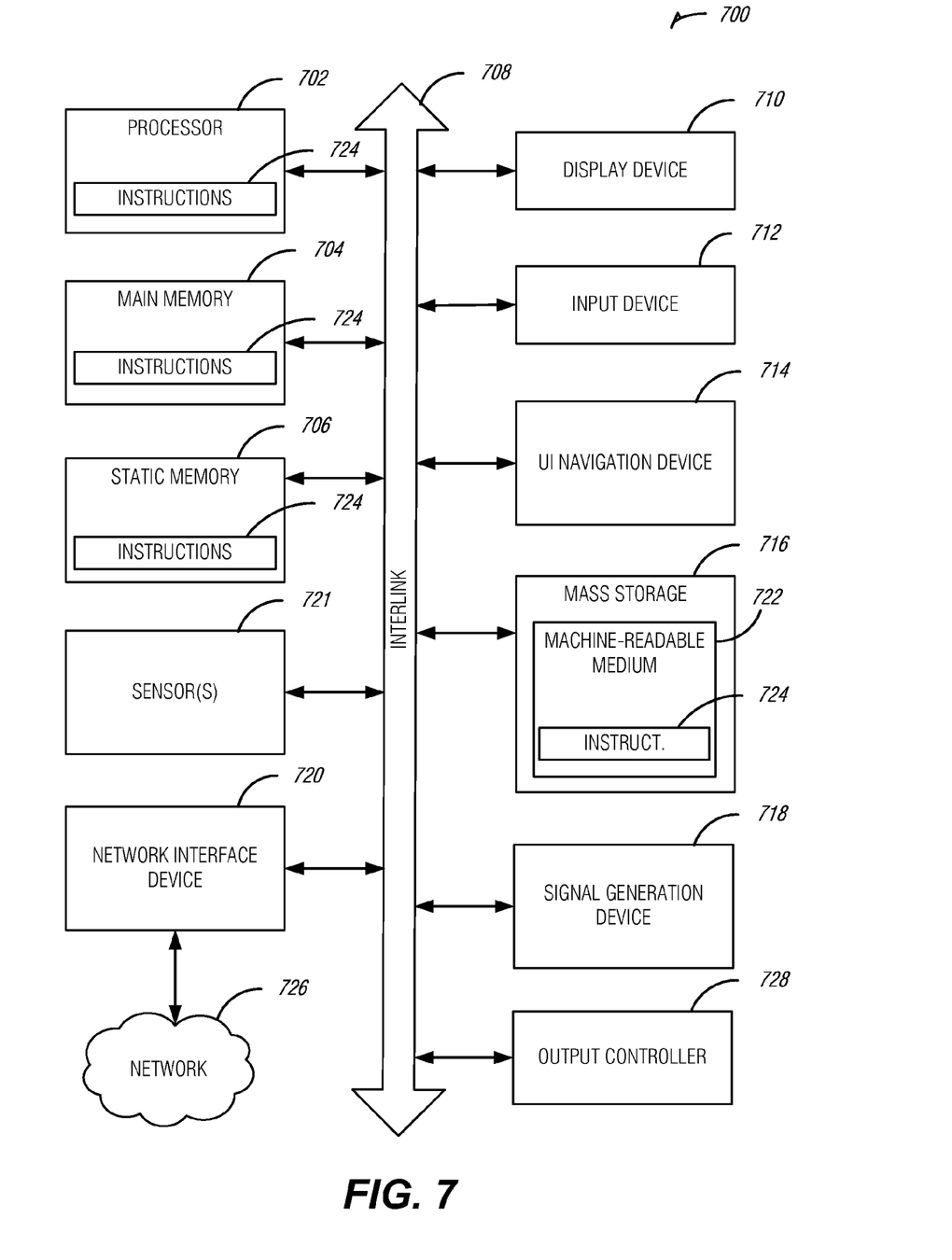
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

ADDITIONAL NOTES & EXAMPLES

Example 1 is a system to prevent face-based authentication spoofing, the system comprising: an emitter controller to control a visible light emitter to project a pattern into a field of view for a camera during an authentication attempt using a face; an image sampler to obtain an image from the camera for the authentication attempt; and a spoofing detection controller to: identify a potential spoofing region of the image by finding the pattern within predetermined tolerances in the image; and prevent an authentication attempt based on a face found in the potential spoofing region.

In Example 2, the subject matter of Example 1 may optionally include, wherein the visible light emitter is a device display.

In Example 3, the subject matter of Example 2 may optionally include, wherein the pattern is a background of an authentication user interface.

In Example 4, the subject matter of any one or more of Examples 1-3 may optionally include, wherein the pattern is moving.

In Example 5, the subject matter of Example 4 may optionally include, wherein the pattern includes an element scanning across an emission area of the visible light emitter.

In Example 6, the subject matter of any one or more of Examples 4-5 may optionally include, wherein to identify a potential spoofing region of the image by finding the pattern within predetermined tolerances includes the spoofing detection controller arranged to predict a position of the pattern in the image based on time.

In Example 7, the subject matter of any one or more of Examples 1-6 may optionally include, wherein the pattern includes a foreground and a background.

In Example 8, the subject matter of Example 7 may optionally include, wherein the foreground and background are high contrast.

In Example 9, the subject matter of Example 8 may optionally include, wherein the foreground is black and the background is white.

In Example 10, the subject matter of any one or more of Examples 7-9 may optionally include, wherein the background is selected to illuminate the face for the authentication attempt.

In Example 11, the subject matter of Example 10 may optionally include, wherein the pattern includes features to distinguish it from organic features.

In Example 12, the subject matter of Example 11 may optionally include, wherein the pattern consist of straight lines.

In Example 13, the subject matter of Example 12 may optionally include, comprising a library controller to: receive a user submitted pattern; and test the user submitted pattern to determine whether it has features to distinguish it from organic features.

In Example 14, the subject matter of Example 13 may optionally include, wherein the spoofing controller is arranged to include the user submitted pattern in a library of patterns when it does have features to distinguish it from organic features, and rejecting the user submitted pattern otherwise.

In Example 15, the subject matter of Example 14 may optionally include, wherein the library controller is arranged to: add features that are distinguishable from organic features to the user submitted pattern including the user submitted pattern in a library of patterns when it does not have features to distinguish it from organic features; and including the modified user submitted pattern to a library of patterns.

In Example 16, the subject matter of Example 15 may optionally include, wherein to identify a potential spoofing region of the image by finding the pattern within predetermined tolerances in the image includes the spoofing detection controller arranged to find a feature of the pattern.

In Example 17, the subject matter of Example 16 may optionally include, wherein the feature is a line edge.

In Example 18, the subject matter of Example 17 may optionally include, wherein to identify a potential spoofing region of the image by finding the pattern within predetermined tolerances in the image includes the spoofing controller arranged to: find the pattern across a plurality of images, including the image; measure a signal-to-noise ratio for a region in which the pattern was previously found, across the plurality of images; and make the region the potential spoofing region when the signal-to-noise ratio is beyond a threshold.

Example 19 is a method to prevent face-based authentication spoofing, the method comprising: controlling a visible light emitter to project a pattern into a field of view for a camera during an authentication attempt using a face; obtaining an image from the camera for the authentication attempt; identifying a potential spoofing region of the image by finding the pattern within predetermined tolerances in the image; and preventing an authentication attempt based on a face found in the potential spoofing region. In a further example, a machine readable medium may include instructions to cause a machine to perform any of Examples 19-36. In a further example, a system may include means to perform any of Examples 19-36.

In Example 20, the subject matter of Example 18 may optionally include, wherein the visible light emitter is a device display.

In Example 21, the subject matter of Example 20 may optionally include, wherein the pattern is a background of an authentication user interface.

In Example 22, the subject matter of any one or more of Examples 19-21 may optionally include, wherein the pattern is moving.

In Example 23, the subject matter of Example 22 may optionally include, wherein the pattern includes an element scanning across an emission area of the visible light emitter.

In Example 24, the subject matter of Example 23 may optionally include, wherein finding the pattern within predetermined tolerances includes predicting a position of the pattern in the image based on time.

In Example 25, the subject matter of any one or more of Examples 19-24 may optionally include, wherein the pattern includes a foreground and a background.

In Example 26, the subject matter of Example 25 may optionally include, wherein the foreground and background are high contrast.

In Example 27, the subject matter of Example 26 may optionally include, wherein the foreground is black and the background is white.

In Example 28, the subject matter of Example 27 may optionally include, wherein the background is selected to illuminate the face for the authentication attempt.

In Example 29, the subject matter of any one or more of Examples 19-28 may optionally include, wherein the pattern includes features to distinguish it from organic features.

In Example 30, the subject matter of Example 29 may optionally include, wherein the pattern consist of straight lines.

In Example 31, the subject matter of any one or more of Examples 2-30 may optionally include, comprising: receiving a user submitted pattern; and testing the user submitted pattern to determine whether it has features to distinguish it from organic features.

In Example 32, the subject matter of Example 31 may optionally include, comprising including the user submitted pattern in a library of patterns when it does have features to distinguish it from organic features, and rejecting the user submitted pattern otherwise.

In Example 33, the subject matter of Example 32 may optionally include, comprising: adding features that are distinguishable from organic features to the user submitted pattern including the user submitted pattern in a library of patterns when it does not have features to distinguish it from organic features; and adding the modified user submitted pattern to a library of patterns.

In Example 34, the subject matter of any one or more of Examples 19-33 may optionally include, wherein finding the pattern within predetermined tolerances in the image includes finding a feature of the pattern.

In Example 35, the subject matter of Example 34 may optionally include, wherein the feature is a line edge.

In Example 36, the subject matter of any one or more of Examples 19-35 may optionally include, wherein identifying a potential spoofing region of the image by finding the pattern within predetermined tolerances in the image includes: finding the pattern across a plurality of images, including the image; measuring a signal-to-noise ratio for a region in which the pattern was previously found, across the plurality of images; and making the region the potential spoofing region when the signal-to-noise ratio is beyond a threshold.

Example 37 is at least one machine readable medium including instructions to prevent face-based authentication spoofing, the instructions, when executed by a machine, cause the machine to perform operations comprising: controlling a visible light emitter to project a pattern into a field of view for a camera during an authentication attempt using a face; obtaining an image from the camera for the authentication attempt; identifying a potential spoofing region of the image by finding the pattern within predetermined tolerances in the image; and preventing an authentication attempt based on a face found in the potential spoofing region.

In Example 38, the subject matter of Example 36 may optionally include, wherein the visible light emitter is a device display.

In Example 39, the subject matter of Example 38 may optionally include, wherein the pattern is a background of an authentication user interface.

In Example 40, the subject matter of Example 39 may optionally include, wherein the pattern is moving.

In Example 41, the subject matter of Example 40 may optionally include, wherein the pattern includes an element scanning across an emission area of the visible light emitter.

In Example 42, the subject matter of Example 41 may optionally include, wherein finding the pattern within predetermined tolerances includes predicting a position of the pattern in the image based on time.

In Example 43, the subject matter of any one or more of Examples 37-42 may optionally include, wherein the pattern includes a foreground and a background.

In Example 44, the subject matter of Example 43 may optionally include, wherein the foreground and background are high contrast.

In Example 45, the subject matter of Example 44 may optionally include, wherein the foreground is black and the background is white.

In Example 46, the subject matter of Example 45 may optionally include, wherein the background is selected to illuminate the face for the authentication attempt.

In Example 47, the subject matter of any one or more of Examples 37-46 may optionally include, wherein the pattern includes features to distinguish it from organic features.

In Example 48, the subject matter of Example 47 may optionally include, wherein the pattern consist of straight lines.

In Example 49, the subject matter of Example 48 may optionally include, comprising: receiving a user submitted pattern; and testing the user submitted pattern to determine whether it has features to distinguish it from organic features.

In Example 50, the subject matter of Example 49 may optionally include, comprising including the user submitted pattern in a library of patterns when it does have features to distinguish it from organic features, and rejecting the user submitted pattern otherwise.

In Example 51, the subject matter of any one or more of Examples 4-50 may optionally include, comprising: adding features that are distinguishable from organic features to the user submitted pattern including the user submitted pattern in a library of patterns when it does not have features to distinguish it from organic features; and adding the modified user submitted pattern to a library of patterns.

In Example 52, the subject matter of any one or more of Examples 37-51 may optionally include, wherein finding the pattern within predetermined tolerances in the image includes finding a feature of the pattern.

In Example 53, the subject matter of Example 52 may optionally include, wherein the feature is a line edge.

In Example 54, the subject matter of any one or more of Examples 37-53 may optionally include, wherein identifying a potential spoofing region of the image by finding the pattern within predetermined tolerances in the image includes: finding the pattern across a plurality of images, including the image; measuring a signal-to-noise ratio for a region in which the pattern was previously found, across the plurality of images; and making the region the potential spoofing region when the signal-to-noise ratio is beyond a threshold.

Example 55 is a system to prevent face-based authentication spoofing, the method comprising: means for controlling a visible light emitter to project a pattern into a field of view for a camera during an authentication attempt using a face; means for obtaining an image from the camera for the authentication attempt; means for identifying a potential spoofing region of the image by finding the pattern within predetermined tolerances in the image; and means for preventing an authentication attempt based on a face found in the potential spoofing region.

In Example 56, the subject matter of Example 55 may optionally include, wherein the visible light emitter is a device display.

In Example 57, the subject matter of Example 56 may optionally include, wherein the pattern is a background of an authentication user interface.

In Example 58, the subject matter of Example 57 may optionally include, wherein the pattern is moving.

In Example 59, the subject matter of Example 58 may optionally include, wherein the pattern includes an element scanning across an emission area of the visible light emitter.

In Example 60, the subject matter of Example 59 may optionally include, wherein finding the pattern within predetermined tolerances includes predicting a position of the pattern in the image based on time.

In Example 61, the subject matter of any one or more of Examples 55-60 may optionally include, wherein the pattern includes a foreground and a background.

In Example 62, the subject matter of Example 61 may optionally include, wherein the foreground and background are high contrast.

In Example 63, the subject matter of Example 62 may optionally include, wherein the foreground is black and the background is white.

In Example 64, the subject matter of Example 63 may optionally include, wherein the background is selected to illuminate the face for the authentication attempt.

In Example 65, the subject matter of any one or more of Examples 55-64 may optionally include, wherein the pattern includes features to distinguish it from organic features.

In Example 66, the subject matter of Example 65 may optionally include, wherein the pattern consist of straight lines.

In Example 67, the subject matter of Example 66 may optionally include means for receiving a user submitted pattern; and means for testing the user submitted pattern to determine whether it has features to distinguish it from organic features.

In Example 68, the subject matter of Example 67 may optionally include means for putting the user submitted pattern in a library of patterns when it does have features to distinguish it from organic features, and rejecting the user submitted pattern otherwise.

In Example 69, the subject matter of Example 68 may optionally include means for adding features that are distinguishable from organic features to the user submitted pattern including the user submitted pattern in a library of patterns when it does not have features to distinguish it from organic features; and means for adding the modified user submitted pattern to a library of patterns.

In Example 70, the subject matter of any one or more of Examples 55-69 may optionally include, wherein finding the pattern within predetermined tolerances in the image includes finding a feature of the pattern.

In Example 71, the subject matter of Example 70 may optionally include, wherein the feature is a line edge.

In Example 72, the subject matter of any one or more of Examples 55-71 may optionally include, wherein identifying a potential spoofing region of the image by finding the pattern within predetermined tolerances in the image includes: means for finding the pattern across a plurality of images, including the image; means for measuring a signal-to-noise ratio for a region in which the pattern was previously found, across the plurality of images; and means for making the region the potential spoofing region when the signal-to-noise ratio is beyond a threshold.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system to prevent face-based authentication spoofing, the system comprising:
    an emitter controller to control a visible light emitter to project a pattern into a field of view for a camera during an authentication attempt using a face;
    an image sampler to obtain an image from the camera for the authentication attempt; and
    a spoofing detection controller to:
        identify a potential spoofing region of the image by finding the pattern within predetermined tolerances in the image; and
        perform facial recognition processing on the image including avoiding facial recognition processing in the potential spoofing region to increase processing efficiency.

2. The system of claim 1, wherein the pattern is moving.

3. The system of claim 1, wherein the pattern includes a foreground and a background.

4. The system of claim 3, wherein the background is selected to illuminate the face for the authentication attempt.

5. The system of claim 1, comprising a library controller to:
receive a user submitted pattern; and
test the user submitted pattern to determine whether it as features to distinguish it from organic features.

6. The system of claim 5, wherein the spoofing controller is arranged to include the user submitted pattern in a library of patterns when it does have features to distinguish the user submitted pattern from organic features, and rejecting the user submitted pattern otherwise.

7. The system of claim 5, wherein the library controller is arranged to:
add features that are distinguishable from organic features to the user submitted pattern to create a modified user submitted pattern; and
add the modified user submitted pattern o the library of patterns.

8. The system of claim 1, wherein to identify a potential spoofing region of the image by finding the pattern within predetermined tolerances in the image includes the spoofing controller arranged to:
find the pattern across a plurality of images, including the image;
measure a signal-to-noise ratio for a region in which the pattern was previously found, across the plurality of images; and
make the region the potential spoofing region when the signal-to-noise ratio is beyond a threshold.

9. A machine-implemented method to prevent face-based authentication spoofing, the method comprising:
controlling a visible light emitter to project a pattern into a field of view for a camera during an authentication attempt using a face;
obtaining an image from the camera for the authentication attempt;
identifying a potential spoofing region of the image by finding the pattern within predetermined tolerances in the image; and
performing facial recognition processing on the image including avoiding facial recognition processing in the potential spoofing region to increase processing efficiency.

10. The method of claim 9, wherein controlling the visible light emitter to project the pattern comprises projecting the pattern with motion.

11. The method of claim 9, wherein the pattern includes a foreground and a background.

12. The method of claim 11, wherein the background is selected to illuminate the face for the authentication attempt.

13. The method of claim 9, comprising:
receiving a user submitted pattern; and
testing the user submitted pattern to determine whether it has features to distinguish it from organic features.

14. The method of claim 13, comprising including the user submitted pattern in a library of patterns when it does have features to distinguish the user submitted pattern from organic features, and rejecting the user submitted pattern otherwise.

15. The method of claim 13, comprising:
adding features that are distinguishable from organic features to the user submitted pattern to create a modified user submitted pattern; and
adding the modified user submitted pattern to the library of patterns.

16. The method of claim 9, wherein identifying a potential spoofing region of the image by finding the pattern within predetermined tolerances in the image includes:
finding the pattern across a plurality of images, including the image;
measuring a signal-to-noise ratio for a region in which the pattern was previously found, across the plurality of images; and
making the region the potential spoofing region when the signal-to-noise ratio is beyond a threshold.

17. At least one non-transitory machine readable medium including instructions stored thereon to prevent face-based authentication spoofing, the instructions, when executed by a machine, cause the machine to perform operations comprising:
controlling a visible light emitter to project a pattern into a field of view for a camera during an authentication attempt using a face;
obtaining an image from the camera for the authentication attempt;
identifying a potential spoofing region of the image by finding the pattern within predetermined tolerances in the image; and
performing facial recognition processing on the image including avoiding facial recognition processing in the potential spoofing region to increase processing efficiency.

18. The at least one non-transitory machine readable medium of claim 17, wherein the pattern is moving.

19. The at least one non-transitory machine readable medium of claim 17, wherein the pattern includes a foreground and a background.

20. The at least one non-transitory machine readable medium of claim 19, wherein the background is selected to illuminate the face for the authentication attempt.

21. The at least one non-transitory machine readable medium of claim 17, comprising:
receiving a user submitted pattern; and
testing the user submitted pattern to determine whether it has features to distinguish it from organic features.

22. The at least one non-transitory machine readable medium of claim 21, comprising including the user submitted pattern in a library of patterns when it does have features to distinguish it from organic features, and rejecting the user submitted pattern otherwise.

23. The at least one non-transitory machine readable medium of claim 21, comprising:
adding features that are distinguishable from organic features to the user submitted pattern to create a modified user submitted pattern; and
putting the modified user submitted pattern to the library of patterns.

24. The at least one non-transitory machine readable medium of claim 17, wherein identifying a potential spoofing region of the image by finding the pattern within predetermined tolerances in the image includes:
finding the pattern across a plurality of images, including the image;
measuring a signal-to-noise ratio for a region in which the pattern was previously found, across the plurality of images; and
making the region the potential spoofing region when the signal-to-noise ratio is beyond a threshold.

* * * * *

UNITED STATES PATENT AND TRADEMARK OFFICE
CERTIFICATE OF CORRECTION

PATENT NO. : 10,198,645 B2
APPLICATION NO. : 14/865763
DATED : February 5, 2019
INVENTOR(S) : Graumann et al.

It is certified that error appears in the above-identified patent and that said Letters Patent is hereby corrected as shown below:

In the Claims

In Column 17, Line 4, in Claim 5, delete "as" and insert --has-- therefor

In Column 17, Line 16, in Claim 7, delete "o" and insert --to-- therefor

Signed and Sealed this
Twenty-eighth Day of April, 2020

Andrei Iancu
*Director of the United States Patent and Trademark Office*